Sept. 13, 1927.

H. HINZER 1,642,243

CABLE SUPPORTING CLAMP

Filed Nov. 18, 1925   2 Sheets-Sheet 1

Heinrich Hinzer
by C. P. Grepel
his Attorney.

Sept. 13, 1927.

H. HINZER

CABLE SUPPORTING CLAMP

Filed Nov. 18, 1925

1,642,243

2 Sheets-Sheet 2

Heinrich Hinzer
by C. P. Goepel
his Attorney.

Patented Sept. 13, 1927.

1,642,243

UNITED STATES PATENT OFFICE.

HEINRICH HINZER, OF ESSEN ON-THE-RUHR, GERMANY.

CABLE-SUPPORTING CLAMP.

Application filed November 18, 1925, Serial No. 69,945, and in Germany June 19, 1925.

My invention relates to improvements in apparatus for mounting current-conducting wires of cables in mines and other rooms to relatively fixed parts. The object of the improvements is to provide an apparatus to be used as a permanent fixture in electric power plants, by means of which apparatus the live wire or cable can be readily mounted or dismounted, and in which the elements of the connection are not made unremovable by corrosion. With this object in view my invention consists in fixing the live wire or cable to a bracket by means of a wedge or wedges.

Figure 4:
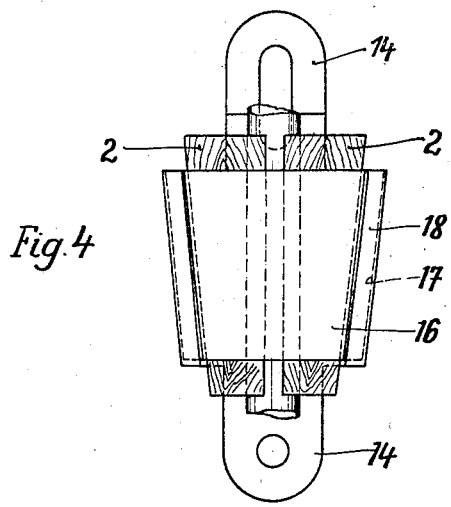
Figure 5:
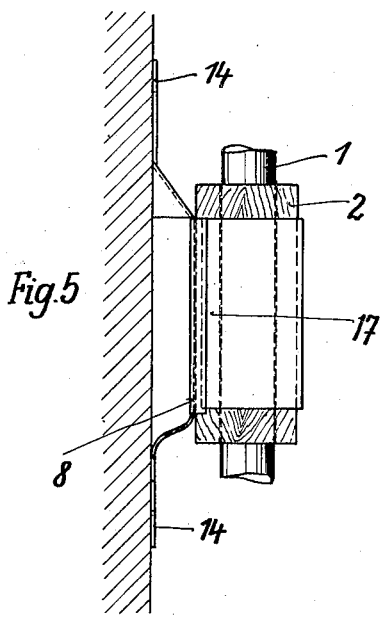
Figure 6:
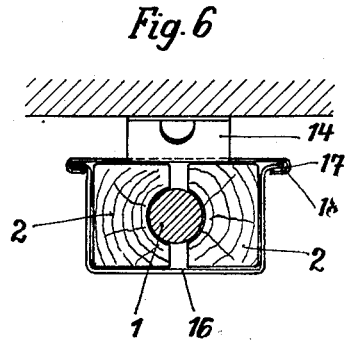
Figure 7:
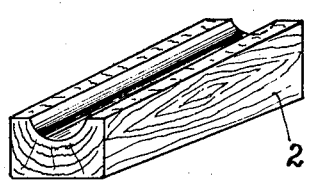

For the purpose of explaining the invention several examples embodying the same have been shown in the accompanying drawings, in which the same reference characters have been used in all the views to indicate corresponding parts. Throughout the rest of my specification I have used the simple expression "cable" in the meaning of "electric current conducting wire or cable." In said drawings, Fig. 1, is an elevation of the apparatus for mounting the cable, Fig. 2, is an elevation looking from the left in Fig. 1, Fig. 3, is a top-plan view of the apparatus, Fig. 4, is an elevation showing a modification of the apparatus, Fig. 5 is an elevation looking from the left in Fig. 4, Fig. 6, is a top-plan view of Fig. 4, Fig. 7, is a perspective view showing one of the wedges used in the apparatus shown in Figs. 4 to 6, and Fig. 8, is a diagrammatical view showing an apparatus for horizontally disposed cables.

Figure 1:
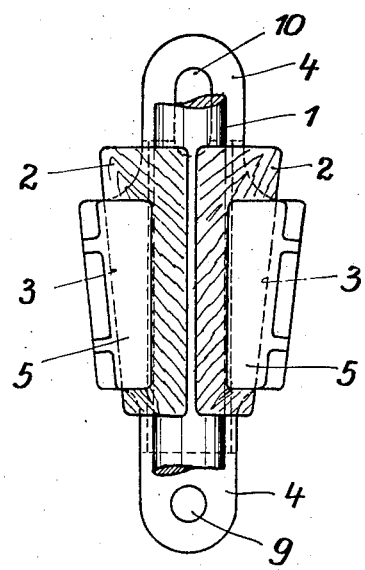
Figure 2:
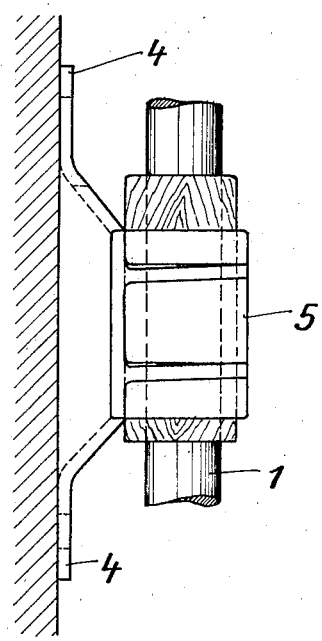
Figure 3:
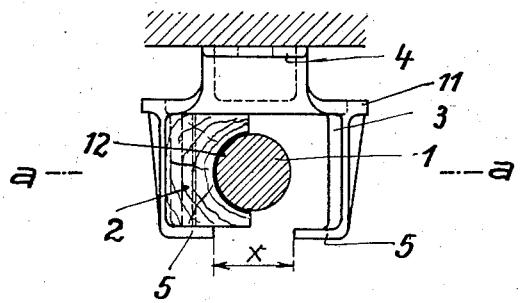

In the example shown in Figs. 1 to 3 the cable is mounted in a bracket comprising a shoe 4 provided with an eye 9 and a slot 10 for securing the same in position and a plate 11 carrying arms 3 formed with inwardly directed flanges 5. The arms 3 are in the form of plates which are directed inwardly and downwardly. The distance $x$ between the inner ends of the flanges 5, 5 is equal to or larger than the diameter of the cable 1, so that the said cable can be readily passed into the bracket between the said flanges. Between the inclined side walls 3, 3 and the cable 1 there are wedges 2, 2 preferably made from wood and having at their adjacent faces semi-cylindrical grooves 12 corresponding to the cable 1.

For fixing the cable to the desired part of the wall of the mine or other room, the bracket 3, 4 is fixed to the said part by means of screw-bolts passed through the eye 9 and the slot 10. Thereafter the cable is passed into the bracket through the slot $x$ thereof, and the wedges 2 are passed into position between the cable and the walls 3. By forcing the wedges downwardly the cable 1 is securely fixed in position. If it is desired to remove the cable from the bracket the passages can be readily made loose by forcing the same upwardly by means of a hammer or the like, and such disconnection can be made at any time because the wedges do not stick to the cable or the bracket 3, 4 by corrosion.

In the modification shown in Figs. 4 to 7 the apparatus consists of a shoe 8 in the form of a plate made integral with arms 14, 14 adapted to be fixed to a wall or the like. To the plate 8 a member 16 is fixed, the side walls of which are inclined downwardly and inwardly, and which is formed with flanges 17 engaged by upturned flanges 18 of the plate 8. The cable 1 is fixed in position within the apparatus by means of the wedges 2, 2.

For fixing the cable to the apparatus the member 16 is passed over the same and slid with its flanges 17 into the upturned flanges 18 of the plate 8, whereupon the wedges 2, 2 are passed into position between the cable and the member 16 and forced downwardly by means of a hammer or the like.

In the example shown in the figures the flanges 17 and 18 are inclined downwardly and towards each other. But I wish it to be understood that I do not limit myself to this feature, and that in some cases I provide a rectangular plate 8 having parallel flanges 18.

Figure 8:
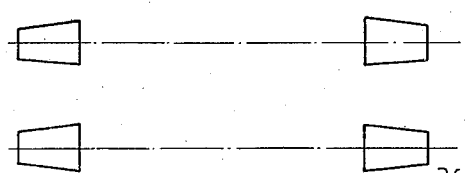

In the examples so far described only one pair of wedges 2, 2 is used for fixing the cable in position, the connection between the wedges and the bracket being made more firm by the downward pull exerted on the cables. For mounting horizontal cables I use two brackets each comprising two wedges forced into clamping position from opposite sides. Fig. 8 shows an example in a diagrammatical way.

I claim:

1. A cable supporting-clamp, comprising a socket having opposite flat front and rear wall members, the rear wall being provided with means for connecting it to a support such as a wall or post, the socket also having opposite flat side walls of substantial width and depth arranged at right angles to the front and rear wall members and also arranged in downwardly convergent angular relation to each other, and wedges each having a face longitudinally grooved to fit a segment of a cable, an opposite flat face in angular, downwardly convergent relation to the grooved face, and flat, parallel front and rear faces, the wedges being insertable in the socket to clamp a cable therein by convergent movement of the wedges caused by cooperation of their angular faces with the angular socket walls, the front and rear socket wall members also cooperating with the opposite parallel wedge faces to retain the wedges in the socket.

2. A cable supporting-clamp, comprising a socket having opposite flat front and rear wall members, the rear wall being provided with means for connecting to a support such as a wall or post, the socket also having opposite flat side walls of substantial width and depth arranged at right angles to the front and rear wall members and also arranged in downwardly convergent angular relation to each other, and wedges each having a face longitudinally grooved to fit a segment of a cable, an opposite flat face in angular, downwardly convergent relation to the grooved face, and flat, parallel front and rear faces, the wedges being insertable in the socket to clamp a cable therein by convergent movement of the wedges caused by cooperation of their angular faces with the angular socket walls, the front and rear socket wall members also cooperating with the opposite parallel wedge faces to retain the wedges in the socket, the socket side walls and front wall member being arranged as an element separate from the rear wall member, the inner vertical edges of the socket side walls having downwardly convergent flanges and the rear wall member having at its vertical edges downwardly convergent channels to receive said flanges and retain said element in position.

In testimony whereof I hereunto affix my signature.

HEINRICH HINZER.